(12) United States Patent
Chiouchang et al.

(10) Patent No.: US 9,438,803 B1
(45) Date of Patent: Sep. 6, 2016

(54) OPTICAL IMAGE STABILIZING DEVICE

(71) Applicant: UE Technology Co., Ltd., Taichung (TW)

(72) Inventors: Min-Hui Chiouchang, Taichung (TW); Sheng-Chuan Liang, Taichung (TW)

(73) Assignee: UE Technology Co., Ltd., Taichung (TW)

( * ) Notice: Subject to any disclaimer, the term of this patent is extended or adjusted under 35 U.S.C. 154(b) by 0 days.

(21) Appl. No.: 15/013,473

(22) Filed: Feb. 2, 2016

(30) Foreign Application Priority Data

Feb. 13, 2015 (TW) .............................. 104105110 A

(51) Int. Cl.
*H04N 5/232* (2006.01)
*H04N 5/225* (2006.01)

(52) U.S. Cl.
CPC ........ *H04N 5/23287* (2013.01); *H04N 5/2253* (2013.01); *H04N 5/2254* (2013.01)

(58) Field of Classification Search
CPC .......................... H04N 5/2254; H04N 5/2328
See application file for complete search history.

(56) References Cited

U.S. PATENT DOCUMENTS

| 2010/0165131 A1* | 7/2010 | Makimoto | G02B 27/646 348/208.7 |
| 2011/0249131 A1* | 10/2011 | Topliss | G02B 27/646 348/208.7 |
| 2015/0296112 A1* | 10/2015 | Park | H04N 5/2257 348/208.7 |

* cited by examiner

*Primary Examiner* — Tuan Ho
(74) *Attorney, Agent, or Firm* — Trop Pruner & Hu, P.C.

(57) ABSTRACT

An optical image stabilizing device is to be formed on a substrate, and includes an outer frame, an image sensor module, and an actuating module. The outer frame module is disposed on the substrate. The outer frame module and the substrate cooperatively define a receiving space. The image sensor module is suspended in the receiving space. The actuating module connects the outer frame module and the image sensor module, and is configured to drive the image sensor module to move for adjusting a relative position of the image sensor module with respect to the outer frame module.

8 Claims, 4 Drawing Sheets

OPTICAL IMAGE STABILIZING DEVICE

CROSS-REFERENCE TO RELATED APPLICATION

This application claims priority of Taiwanese Application No. 104105110, filed on Feb. 13, 2015.

FIELD

The disclosure relates to an optical stabilizing system.

BACKGROUND

An optical image stabilizing device may be utilized in a digital image capturing device. Taiwanese Patent Publication No. I440359 discloses an anti-shake system. The anti-shake system includes a movable part, a support component, and a drive system. An optical component is mounted on the movable part. The support component suspends the movable part. The drive system enables the movable part to move in directions perpendicular to an optic axis. The anti-shake system is configured to move the optical component to offset the effect of external forces applied to the digital image capturing device.

Alternatively, Taiwanese Patent Publication No. M322407 discloses a micro-optical image stabilizer. The micro-optical image stabilizer includes a substrate, a platform disposed on the substrate, four driving components that interconnect the substrate and the platform, and an image sensing component connected to the platform using adhesive. A process of assembling the micro-optical image stabilizer is also disclosed.

Other patent documents, such as Taiwanese Patent Publication No. 1354176 and U.S. Pat. No. 7,489,340, disclose methods of manufacturing a platform that is capable of being actuated to move freely on an imaginary plane, and placing an image sensing component that can be moved and/or rotated for achieving the effect of image stabilization without compromising the quality of the image signal generated by the image sensing component.

However, the image sensing component is manufactured using an integrated circuit packaging process, and includes an outer package structure. In use, a signal generated by the image sensing component is transmitted via a flexible printed circuit (FPC) or wire bonding. In other words, the platform is manufactured for supporting the image sensing component, the outer package structure, and the FPC or the wire bonding, requiring a large area for the platform and an increased height of the assembly of the image sensing component and the platform.

Additionally, during the assembly of the image sensing component and the platform and/or the wire bonding process, external forces applied to the platform may inflict damage and/or deformation to the platform and compromise a sensitivity of the platform and the resulting quality of the image signal generated by the image sensing component. Moreover, the FPC is a component that extends outwardly from the image sensing component, and may similarly cause the above deficiencies.

SUMMARY

One object of the disclosure is to provide an optical image stabilizing device with a novel structure, and one that may be fabricated using an integrated process.

According to the disclosure, an optical image stabilizing device is to be formed on a substrate, and includes an outer frame module, an image sensor module, and an actuating module. The outer frame module is disposed on the substrate. The outer frame module and the substrate cooperatively define a receiving space. The image sensor module is suspended in the receiving space. The actuating module connects the outer frame module and the image sensor module, and is configured to drive the image sensor module to move for adjusting a relative position of the image sensor module with respect to the outer frame module.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
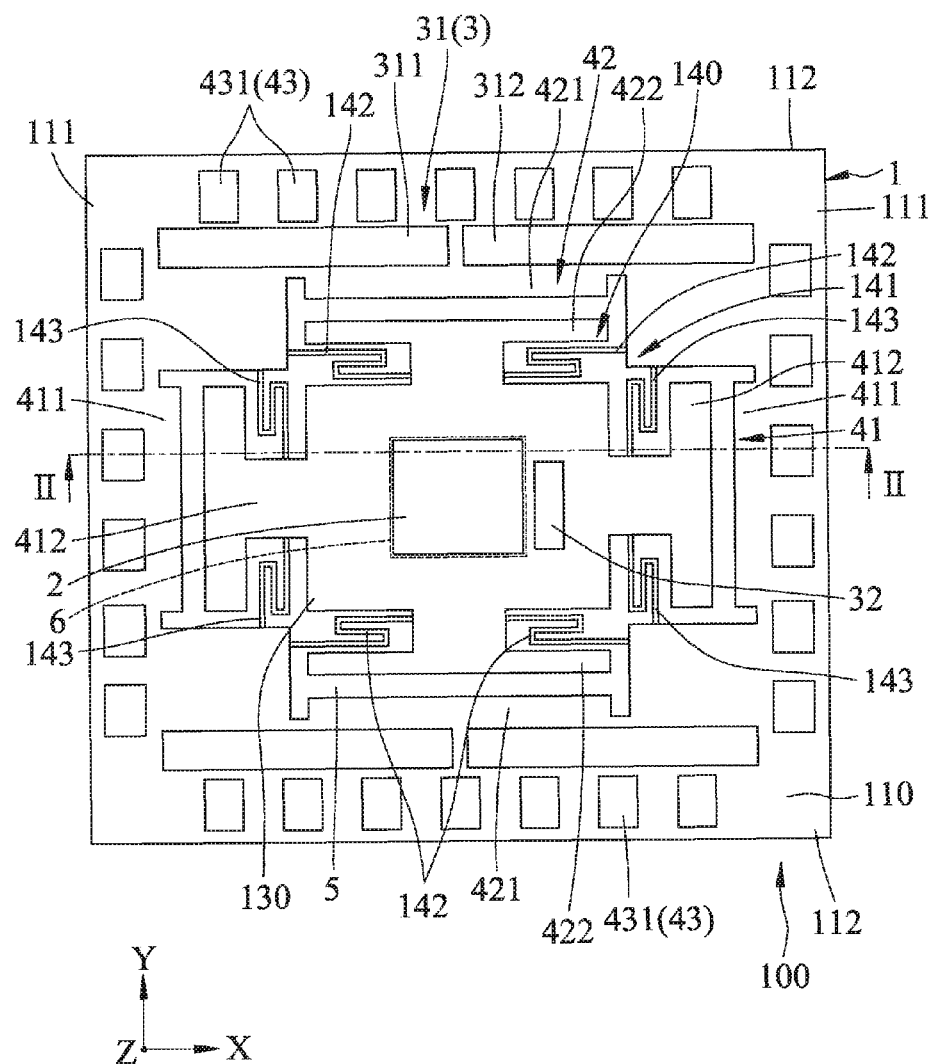
FIG. 1 is a top view illustrating an optical image stabilizing device according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
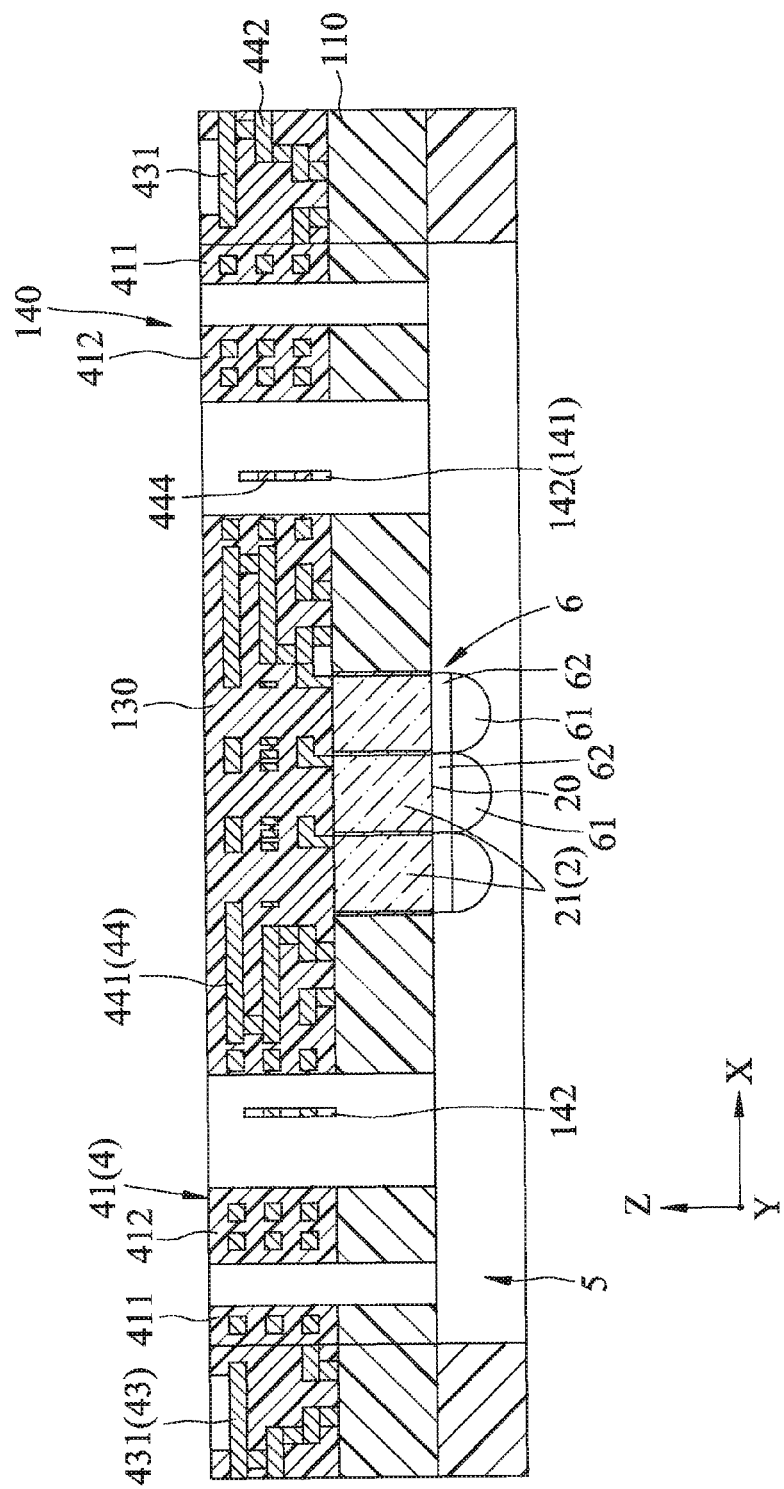
FIG. 2 is a sectional view of the optical image stabilizing device, taken from the line II-II of FIG. 1.

FIGS. 1 and 2 illustrate an optical image stabilizing device 100 according to one embodiment of the disclosure. In this embodiment, the optical image stabilizing device 100 is to be formed on a substrate 1, and to be integrated into a chip using a semiconductor micro-electro-mechanical system (MEMS) process.

The optical image stabilizing device 100 includes an outer frame module 110, an image sensor module 130, an actuating module 140, and an electrical wiring unit 44.

The outer frame module 110 is disposed on the substrate 1, and has two first sides 111 opposite to each other in a first direction (X), and two second sides 112 opposite to each other in a second direction (Y) that is different from the first direction (X). The outer frame module 110 and the substrate 1 cooperatively define a receiving space 5. The outer frame module 110 includes a connection unit 43 and an actuation controller unit 31.

The connection unit 43 includes a plurality of contact pads 431 that are disposed at a periphery of a surface of the outer frame module 110. The contact pads 431 are spaced apart from one another, and are each capable of transferring an electrical signal.

The image sensor module 130 is suspended in the receiving space 5, and includes an image sensor structure 2, an image processing circuit 32, and a micro-lens set 6.

The image sensor structure 2 has a light incident surface 20 that is not covered, and a plurality of light sensing diodes 21 that are arranged in an array. The image processing circuit 32 is coupled to the image sensor structure 2. The micro-lens set 6 is disposed on the light incident surface 20 of the image sensor structure 2. As such, the image sensor structure 2 is structured in the form of a back-illuminated sensor.

Figure 4:
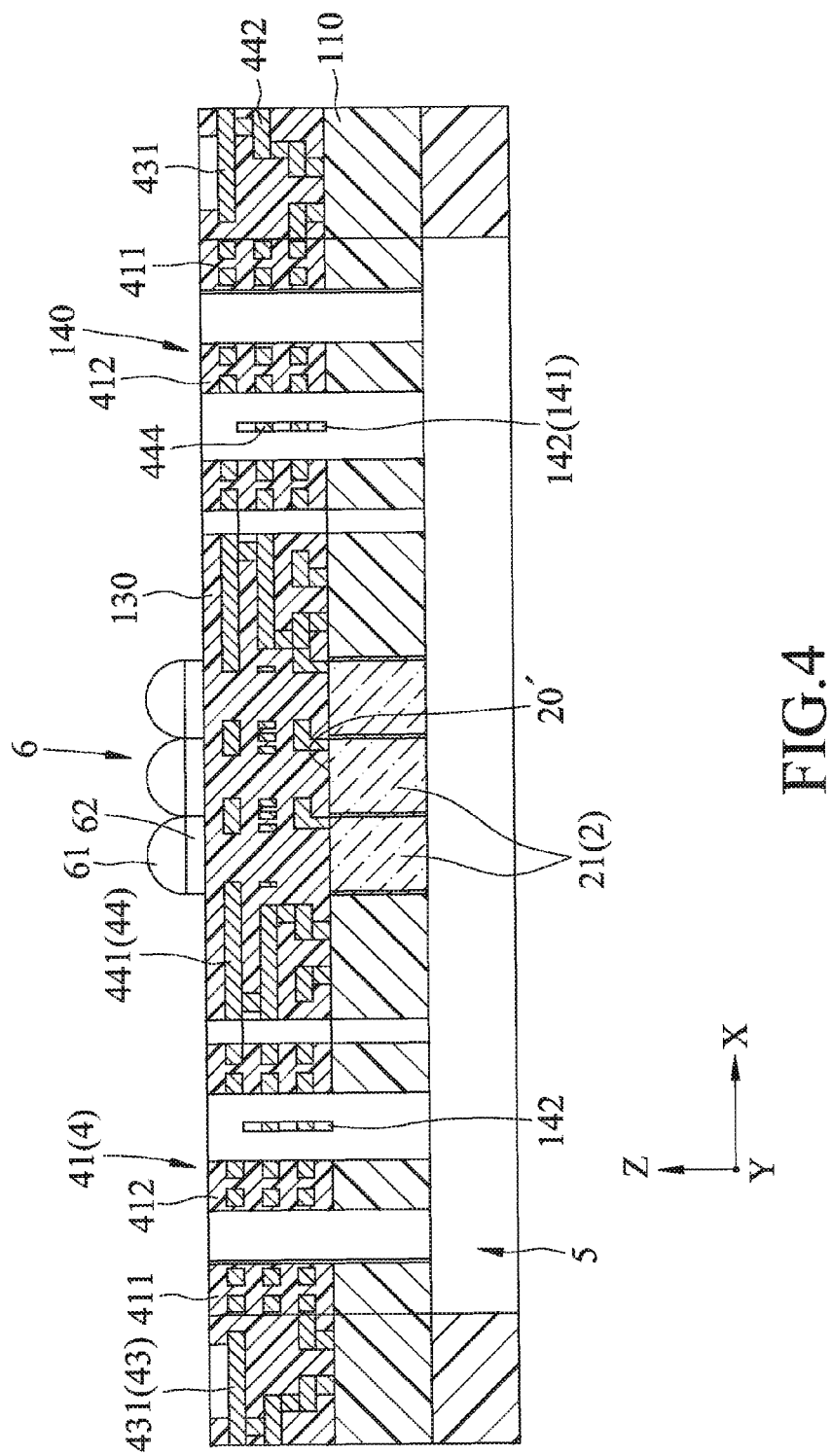
FIG. 4 is a sectional view illustrating an optical image stabilizing device according to one embodiment of the disclosure.

In another embodiment as illustrated in FIG. 4, the image sensor structure 2 has an opposite light incident surface 20', and the micro-lens set 6 is disposed on the light incident surface 20'. As such, the image sensor structure 2 is structured in the form of a front-illuminated sensor.

In the embodiment as illustrated in FIG. 2, the image sensor structure 2 is made using a complementary metal-oxide-semiconductor (CMOS) fabrication process, thereby making the image sensor structure 2 a CMOS sensor. In other embodiments, various fabrication processes may be employed for making the image sensor structure 2, such as a charge-coupled device (CCD) fabrication process.

The micro-lens set 6 includes a plurality of micro-lenses 61 and a plurality of optical filters 62. The micro-lenses 61 are disposed to correspond in position to the light incident surface 20, and to correspond in position to the light sensing diodes 21, respectively. The optical filters 62 in this embodiment are embodied using colored optical filters, and each of the optical filters 62 is disposed between the light incident surface 20 and a respective one of the light sensing diodes 21.

The actuating module 140 is disposed to connect the outer frame module 110 to the image sensor module 130, and is configured to drive the image sensor module 130 to move for adjusting a relative position of the image sensor module 130 with respect to the outer frame module 110.

Specifically, the actuating module 140 includes a first actuating unit 41, a second actuating unit 42 and a suspending unit 141.

The suspending unit 141 is disposed to interconnect the outer frame module 110 and the image sensor module 130, and thereby suspends the image sensor module 130 in the receiving space 5.

Specifically, the suspending unit 141 includes four first suspending components 142 and four second suspending components 143. Each of the first suspending components 142 has two ends that are substantially opposite to each other in the first direction (X) for interconnecting the outer frame module 110 and the image sensor module 130, and has a serpentine shape. Each of the second suspending components 143 has two ends that are substantially opposite to each other in the second direction (Y) for interconnecting the outer frame module 110 and the image sensor module 130, and has a serpentine shape.

The incorporation of the serpentine shapes allows the first suspending components 142 and the second suspending components 143 to deform in various directions in response to forces applied thereto.

It is noted that in other embodiments, other configurations of the first suspending components 142 and the second suspending components 143 may be employed.

The first actuating unit 41 includes two first electrodes 411 and two second electrodes 412. The first electrodes 411 are disposed respectively at the first sides 111 of the outer frame module 110, and the second electrodes 412 are disposed at sides of the image sensor module 130 to respectively correspond in position to the first electrodes 411.

The second actuating unit 42 includes two third electrodes 421 and two fourth electrodes 422. The third electrodes 421 are disposed respectively at the second sides 112 of the outer frame module 110, and the fourth electrodes 422 are disposed at sides of the image sensor module 130 to respectively correspond in position to the third electrodes 421.

The electrical wiring unit 44 includes a first wire 441, a second wire 442 and an interconnecting wire 444.

The first wire 441 is disposed in the image sensor module 130 so as to form an electrical connection among the light sensing diodes 21, the image processing circuit 32, the second electrodes 412, and the fourth electrodes 422.

The second wire 442 is disposed in the outer frame module 110 so as to form an electrical connection among the connection unit 43, the actuation controller unit 31, the first electrodes 411, and the third electrodes 421.

The interconnecting wire 444 is disposed in the suspending unit 141 so as to form an electrical connection between the first wire 441 and the second wire 442.

Operations of the first actuating unit 41 and the second actuating unit 42 are able to move the image sensor module 130 with respect to the outer frame module 110 in at least the first direction (X) and the second direction (Y).

Specifically, when the first actuating unit 41 and the second actuating unit 42 are not actuated, the suspending unit 141 suspends the image sensor module 130 at an initial location in the receiving space 5. When actuated, the first actuating unit 41 is configured to move the image sensor module 130 with respect to the outer frame module 110 in the first direction (X), and the second actuating unit 42 is configured to move the image sensor module 130 with respect to the outer frame module 110 in the second direction (Y).

In this embodiment, the first actuating unit 41 and the second actuating unit 42 are actuated by an electrical signal from the actuation controller unit 31.

Specifically, the actuation controller unit 31 includes a motion detecting component 311 and an actuation component 312. The actuation component 312 of the actuation controller unit 31 is coupled to the first actuating unit 41 and the second actuating unit 42 for actuating and controlling the same. When the electrical signal is generated by the actuation component 312 and transmitted to the first electrodes 411 and the second electrodes 412 of the first actuating unit 41, electrical charges are applied to each of the first electrodes 411 and the second electrodes 412.

As a result, an electrostatic force, repelling or attracting, is generated between each of the first electrodes 411 and the respective second electrode 412, driving the image sensor module 130 to move along the first direction (X). Similarly, when electrical charges are provided by the electrical signal to the third electrodes 421 and the fourth electrodes 422 of the second actuating unit 42, an electrostatic force, repelling or attracting, is generated between each of the third electrodes 421 and the respective fourth electrode 422, driving the image sensor module 130 to move along the second direction (Y).

The movement of the image sensor module 130 further drives the first suspending components 142 and the second suspending components 143 to deform.

In one embodiment, in addition to the first direction (X) and the second direction (Y), operations of the first actuating unit 41 and the second actuating unit 42 are capable of driving the image sensor module 130 to move along a third direction (Z) that is different from the first direction (X) and the second direction (Y) (e.g., in this embodiment, the third direction (Z) is perpendicular to the first direction (X) and the second direction (Y)), with respect to the outer frame module 110. This may be done by configuring the electrodes of the first actuating unit 41 and the second actuating unit 42 to have multiple layers arranged along the third direction (Z), and to provide different electrical charges to each of the layers. As such, the resulting force between the layers is able to drive the image sensor module 130 to move along the third direction (Z).

In another embodiment, the movement of the image sensor module 130 may be driven by deformation of the suspending unit 140. Specifically, the first suspending components 141 and the second suspending components 142 may be configured to deform in response to actuation, driving the image sensor module 130 to move with respect to the outer frame module 110. For example, the first suspending components 141 and the second suspending components 142 may be made to have different layers each having a particular coefficient of thermal expansion. As such, when the electrical signal is applied to the first suspending components 141 and the second suspending components 142, the resulting heat may cause the first suspending components 141 and the second suspending components 142 to deform.

Figure 3:
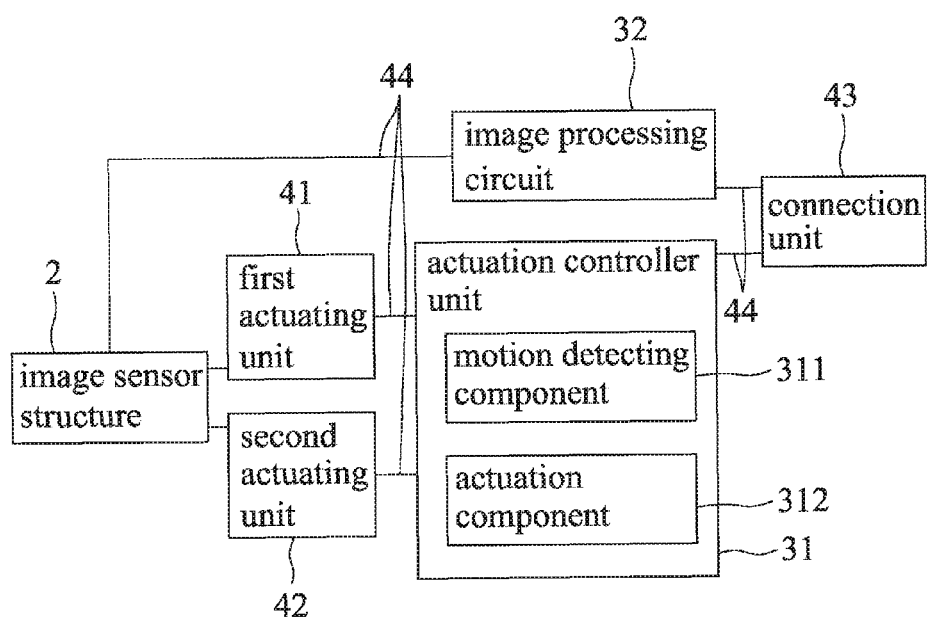
FIG. 3 is a block diagram illustrating some of the components included in the optical image stabilizing device according to one embodiment of the disclosure.

FIG. 3 is a block diagram of the optical image stabilizing device 100 according to an embodiment of the disclosure. The optical image stabilizing device 100 may be integrated in a portable electronic device (not shown in the drawings) and communicate with other components of the portable electronic device using the connection unit 43.

In use, the image sensor structure 2 of the optical image stabilizing device 100 is configured to perform an image capturing process, in which external light passing through the micro-lenses 61 of the micro-lens set 6 is converged, before striking (being incident upon) the light incident surface 20. In response, the light sensing diodes 21 cooperatively generate a sensing signal. The image processing circuit 32 is configured to process the sensing signal to generate an image signal. The image signal may then be transmitted to the portable electronic device via the electrical wiring unit 44 and the connection unit 43, such that the portable electronic device is able to display the image signal as an image file and/or to store the image file.

During the image capturing process, when the portable electronic device is subjected to an external force (e.g., shake of hands of a user), the motion detecting component 311 is configured to detect a strength and a direction associated with the external force, and to generate a force vector signal based in the strength and the direction thus detected. The actuation component 312 is configured to generate the electrical signal according to the force vector signal, in order to control the first electrodes 411 and the second electrodes 412 of the first actuating unit 41 and/or the third electrodes 421 and the fourth electrodes 422 of the second actuating unit 42 for moving the image sensor module 130 in a manner that offsets the effect of the external force. As a result, the image sensor structure 2 is able to perform image capturing process normally even if the portable electronic device is subjected to an external impact.

In one embodiment, the actuation controller unit 31 is a component integrated in the portable electronic device, and communicates with the optical image stabilizing device 100 via the connection unit 43. In this manner, the optical image stabilizing device 100 may be made with a more simplified structure.

In one embodiment, the optical image stabilizing device 100 may incorporate one or more components with various other functionalities.

To sum up, the optical image stabilizing device 100 as described in the disclosure provides a novel structure that may be fabricated using a more integrated process, and that may be fabricated to have a size that is relatively smaller than conventional optical image stabilizing devices. Moreover, by integrating the optical image stabilizing device 100 in a single chip on one substrate 1, the need to assemble the optical image stabilizing device 100 may be eliminated.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An optical image stabilizing device to be formed on a substrate and comprising:
    an outer frame module disposed on the substrate, said outer frame module includes a connection unit for transferring an electrical signal, said outer frame module and the substrate cooperatively defining a receiving space;
    an image sensor module suspended in the receiving space;
    an actuating module connecting said outer frame module and said image sensor module; and
    an electrical wiring unit that includes:
        a first wire formed in said image sensor module;
        a second wire formed in said outer frame module and electrically connected to said connection unit; and
        an interconnecting wire formed in said actuating module and interconnecting said first wire and said second wire;
    wherein said actuating module is configured to drive said image sensor module to move for adjusting a relative position of said image sensor module with respect to said outer frame module.

2. The optical image stabilizing device of claim 1, wherein said actuating module includes:
    a first actuating unit disposed on at least one of said outer frame module and said image sensor module, and configured to move said image sensor module with respect to said outer frame module in a first direction;
    a second actuating unit disposed on at least one of said outer frame module and said image sensor module, and configured to move said image sensor module with respect to said outer frame module in a second direction different from the first direction; and
    a suspending unit interconnecting said outer frame module to said image sensor module, and suspending said image sensor module in the receiving space
    wherein said suspending unit suspends said image sensor module at an initial location in the receiving space when said first and second actuating units are not actuated, and is deformed along with movement of said image sensor module when said first and second actuating units are actuated to move said image sensor module with respect to said outer frame module.

3. The optical image stabilizing device of claim 1, wherein said actuating module includes a suspending unit interconnecting said outer frame module to said image sensor module and configured to be actuated to deform for moving said image sensor module with respect to said outer frame module.

4. The optical image stabilizing device of claim 3, wherein said outer frame module includes an actuation controller unit that is coupled to said suspending module and said first and second actuating units by said electrical wiring unit, and that is for actuating and controlling said suspending module, said first and second actuating units to move said image sensor module.

5. The optical image stabilizing device of claim 2, wherein said outer frame module has two sides opposite to each other in the first direction, and said first actuating unit includes two first electrodes disposed respectively at said sides of said outer frame module, and two second electrodes disposed on said image sensor module and corresponding respectively with said first electrodes in position;

wherein one of said first electrodes and a corresponding one of said second electrodes are configured to generate one of an attracting force and a repelling force therebetween for moving said image sensor module in the first direction;

wherein said outer frame module has two sides opposite to each other in the second direction, and said second actuating unit includes two third electrodes disposed respectively at said sides of said outer frame module, and two fourth electrodes disposed on said image sensor module and corresponding respectively with said third electrodes in position;

wherein one of said third electrodes and a corresponding one of said fourth electrodes are configured to generate one of an attracting force and a repelling force therebetween for moving said image sensor module in the second direction.

6. The optical image stabilizing device of claim 2, wherein at least one of said first and second actuating units further enables said image sensor module to move with respect to said outer frame module in a third direction that is different from the first direction and the second direction.

7. The optical image stabilizing device of claim 1, wherein said image sensor module includes an image sensor structure configured to generate a sensing signal, and an image processing circuit electrically connected to said image sensor for processing the sensing signal in order to generate an image signal, wherein said image sensor is one of a charge-coupled device (CCD) sensor and a complementary metal-oxide-semiconductor (CMOS) sensor.

8. The optical image stabilizing device of claim 7, wherein:

said image sensor structure has a light incident surface; and said image sensor module further includes a micro-lens set disposed to correspond in position to said light incident surface, said micro-lens set including a plurality of micro-lenses, and a plurality of optical filters disposed between said light incident surface and said plurality of micro-lenses.

\* \* \* \* \*